US008635494B2

(12) United States Patent
Cho

(10) Patent No.: US 8,635,494 B2
(45) Date of Patent: Jan. 21, 2014

(54) BACKUP AND RESTORATION FOR A SEMICONDUCTOR STORAGE DEVICE

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 0 days.

(21) Appl. No.: 12/771,136

(22) Filed: Apr. 30, 2010

(65) Prior Publication Data

US 2011/0271143 A1 Nov. 3, 2011

(51) Int. Cl.
*G06F 11/00* (2006.01)
(52) U.S. Cl.
USPC .................................. 714/22; 714/14; 714/24
(58) Field of Classification Search
USPC .................................................. 714/14, 22, 24
See application file for complete search history.

(56) References Cited

U.S. PATENT DOCUMENTS

| 5,241,508 A * | 8/1993 | Berenguel et al. ............. 365/229 |
| 5,499,337 A * | 3/1996 | Gordon ......................... 714/6.12 |
| 2005/0188149 A1* | 8/2005 | Kaler ............................ 711/103 |
| 2009/0049234 A1* | 2/2009 | Oh et al. ....................... 711/103 |
| 2009/0077312 A1* | 3/2009 | Miura ............................ 711/113 |
| 2009/0119353 A1* | 5/2009 | Oh et al. ....................... 707/205 |
| 2009/0172469 A1* | 7/2009 | Xiao .............................. 714/14 |
| 2010/0332897 A1* | 12/2010 | Wilson ........................... 714/14 |
| 2011/0072430 A1* | 3/2011 | Mani ............................. 718/1 |

FOREIGN PATENT DOCUMENTS

KR    10-2010-0027441 A    3/2010

OTHER PUBLICATIONS

Fusion-io Announces the ioDrive Duo—The World's Fastest and Most Innovative SSD, Mar. 11, 2009, http://www.fusionio.com/press/Fusion-io-Announces-the-ioDrive-Duo-The-World-s-Fastest-and-Most-Innovative-SSD.*
Office Action dated Dec. 29, 2011 in Korean Application No. 10-2011-0040756, filed Apr. 29, 2011.

* cited by examiner

*Primary Examiner* — Joshua Lohn
(74) *Attorney, Agent, or Firm* — Saliwanchik, Lloyd & Eisenscenk

(57) ABSTRACT

Provided is a RAID controlled storage device of a PCI-Express (PCI-e) type, which provides data storage/reading services through a PCI-Express interface. The RAID controller typically includes a disk mount coupled to a set of PCI-Express SSD memory disk units, the set of PCI-Express SSD memory disk units comprising a set of volatile semiconductor memories; a disk monitoring unit coupled to the disk mount for monitoring the set of PCI-Express memory disk units; a disk plug and play controller coupled to the disk monitoring unit and the disk mount for controlling the disk mount; a high speed host interface coupled to the disk monitoring unit and the disk mount for providing high-speed host interface capabilities; a disk controller coupled to the high speed host interface and the disk monitoring unit; and a host interface coupled to the disk controller.

20 Claims, 6 Drawing Sheets

BACKUP AND RESTORATION FOR A SEMICONDUCTOR STORAGE DEVICE

CROSS-REFERENCE TO RELATED APPLICATION

This application is related in some aspects to commonly-owned, co-pending application number 12/758,937, entitled "SEMICONDUCTOR STORAGE DEVICE", filed on Apr. 13, 2010, the entire contents of which are herein incorporated by reference.

FIELD OF THE INVENTION

The present invention relates to a semiconductor storage device of a PCI-Express (PCI-e) type. Specifically, the present invention relates to backup and restoration for a storage device of a PCI-Express type.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

Embodiments of the present invention provide a backup and restoration functions for a storage device of a PCI-Express (PCI-e) type that supports a low-speed data processing speed for a host. Specifically, embodiments of this invention provide backup and restoration functions for one or more (i.e., a set of) semiconductor storage devices (SSDs). In general, the present invention provides a secondary power supply coupled to a backup controller and a backup storage device. When a primary power supply is deactivated (e.g., fails), the secondary power supply is activated. In response to this activation, the backup controller will backup any data stored on any SSDs of the storage system (as well as any data stored in main memory of the storage system or in main memory of any host server connected thereto). When the primary power supply is reactivated, the secondary power supply is deactivated and all data backed up is restored to its original source.

A first aspect of the present invention provides a system for backing up and restoring a semiconductor storage device (SSD), comprising: a secondary power supply coupled to an SSD backup controller; a backup storage device; and at least one SSD memory disk unit wherein the secondary power supply is activated in response to a deactivation of a primary power supply, and wherein the backup controller backs up SSD data stored on the at least one SSD memory disk unit to the backup storage device in response to the failure of the primary power supply.

A second aspect of the present invention provides a system for backing up and restoring a network-based semiconductor storage device (SSD), comprising: a storage system comprising a storage system main memory and at least one SSD memory disk unit; a host server coupled to the storage system, the host server comprising a server main memory unit; and a secondary power supply coupled to a backup controller and a backup storage device, wherein the backup controller is activated in response to a deactivation of a primary power supply, and wherein the backup controller backs up: server data from the host server main memory, storage system data from the storage system main memory, and SSD data from the at least one SSD memory disk unit to the backup storage system in response to the activation of the secondary power supply.

A third aspect of the present invention provides a method for backing up and restoring a semiconductor storage device (SSD), comprising: providing a secondary power supply coupled to an SSD backup controller, a backup storage device, and at least one SSD memory disk unit; activating the secondary power supply in response to a deactivation of a primary power supply; and backing up SSD data stored on the at least one SSD memory disk unit to the backup storage device using the backup controller in response to the failure of the primary power supply.

BRIEF DESCRIPTION OF THE DRAWINGS

These and other features of this invention will be more readily understood from the following detailed description of the various aspects of the invention taken in conjunction with the accompanying drawings in which.

Figure 1:
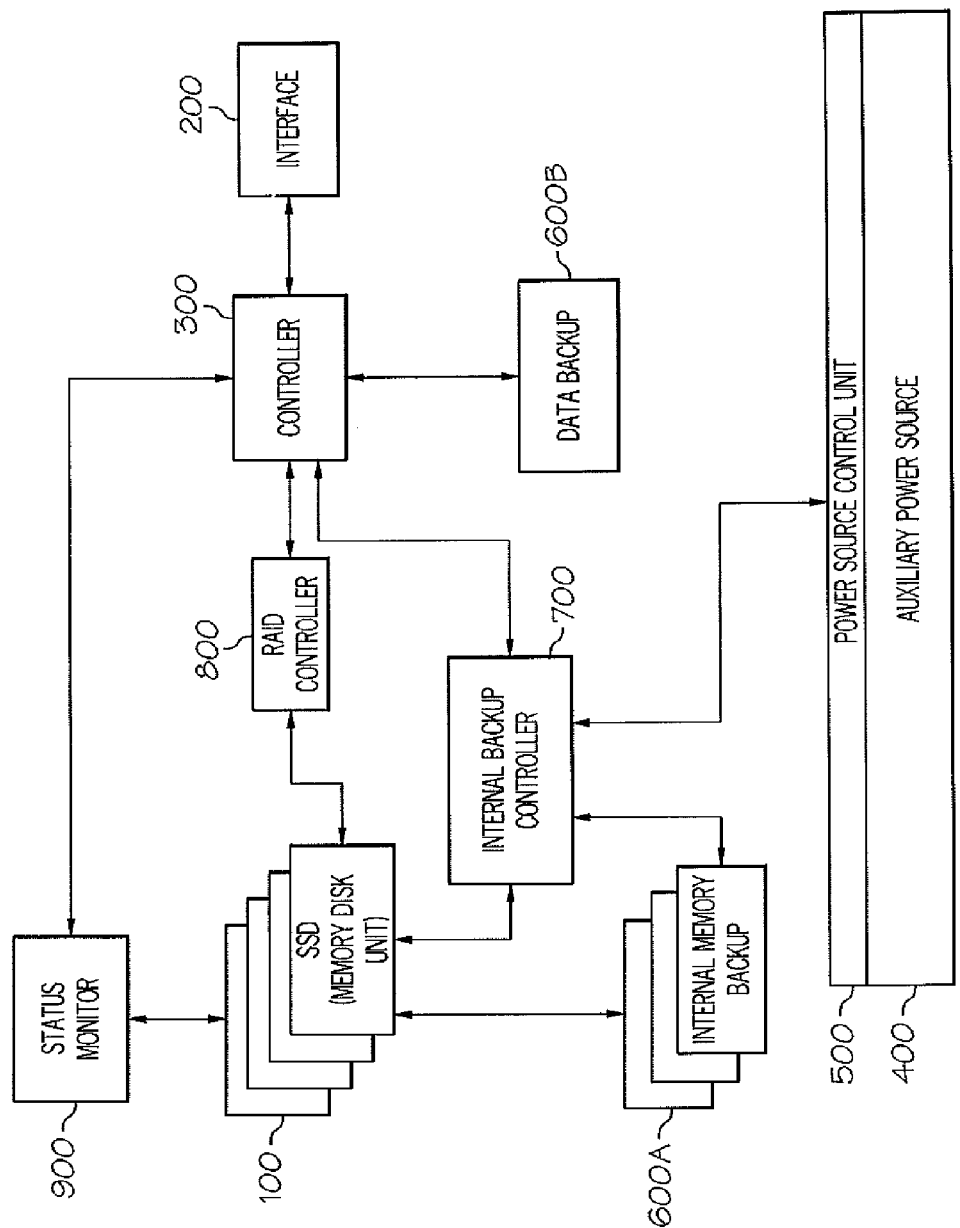
FIG. 1 is a diagram schematically illustrating a configuration of a storage device of a PCI-Express (PCI-e) type according to an embodiment.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limited to this disclosure. As used herein, the singular forms "a", "an", and "the" are intended to include the plural forms as well, unless the context clearly indicates otherwise. Furthermore, the use of the terms "a", "an", etc. do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a storage device of a PCI-Express (PCI-e) type according to an embodiment will be described in detail with reference to the accompanying drawings.

Embodiments of the present invention provide a backup and restoration functions for a storage device of a PCI-Express (PCI-e) type that supports a low-speed data processing speed for a host. Specifically, embodiments of this invention provide backup and restoration functions for one or more (i.e., a set of) semiconductor storage devices (SSDs). In general, the present invention provides a secondary power supply coupled to a backup controller and a backup storage device. When a primary power supply is deactivated (e.g., fails), the secondary power supply is activated. In response to this activation, the backup controller will backup any data stored on any SSDs of the storage system (as well as any data stored in main memory of the storage system or in main memory of any host server connected thereto). When the primary power supply is reactivated, the secondary power supply is deactivated and all data backed up is restored to its original source.

The storage device of a PCI-Express (PCI-e) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

Referring now to FIG. 1, a diagram schematically illustrating a configuration of a PCI-Express type, RAID controlled storage device (e.g., for providing storage for a PCI-Express (PCI-e) type according to an embodiment of the invention) is shown. As depicted, FIG. 1 shows a RAID controlled PCI-Express type storage device according to an embodiment of the invention which includes a memory disk unit 100 comprising: a plurality of memory disks having a plurality of volatile semiconductor memories (also referred to herein as high speed SSDs 100); a RAID controller 800 coupled to SSDs 100; an interface unit 200 (e.g., PCI-Express host) which interfaces between the memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit, the memory disk unit, the backup storage unit, and the backup control unit which, when the power transferred from the host through the PCI-Express host interface unit is blocked or an error occurs in the power transferred from the host, receives power from the auxiliary power source unit and supplies the power to the memory disk unit through the controller unit; a backup storage unit 600 that stores data of the memory disk unit; and a backup control unit 700 that backs up data stored in the memory disk unit in the backup storage unit, according to an instruction from the host or when an error occurs in the power transmitted from the host.

The memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The memory disk unit 100 may have a configuration in which the memory disks are arrayed in parallel.

The PCI-Express host interface unit 200 interfaces between a host and the memory disk unit 100. The host may be a computer system or the like, which is provided with a PCI-Express interface and a power source supply device.

The controller unit 300 adjusts synchronization of data signals transmitted/received between the PCI-Express host interface unit 200 and the memory disk unit 100 to control a data transmission/reception speed between the PCI-Express host interface unit 200 and the memory disk unit 100.

Figure 2:
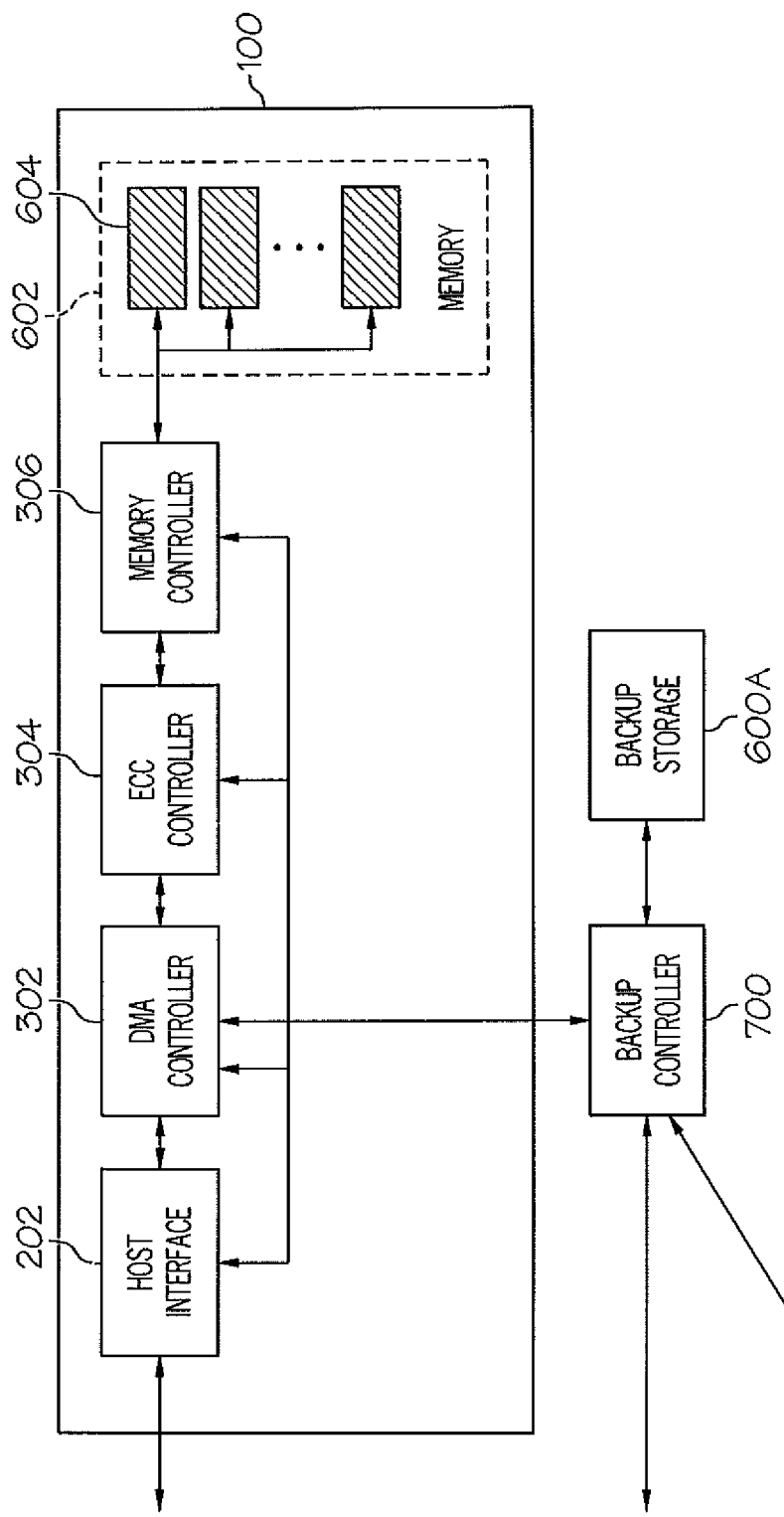
FIG. 2 is a diagram schematically illustrating a configuration of the high speed SSD of FIG. 1.

Referring now to FIG. 2, a diagram schematically illustrating a configuration of the high speed SSD 100 is shown. As depicted, SSD/memory disk unit 100 comprises: a host interface 202 (e.g., PCI-Express host) (which can be interface 200 of FIG. 1, or a separate interface as shown); a DMA controller 302 interfacing with a backup control module 700; an ECC controller 304; and a memory controller 306 for controlling one or more blocks 604 of memory 602 that are used as high-speed storage.

Figure 3:
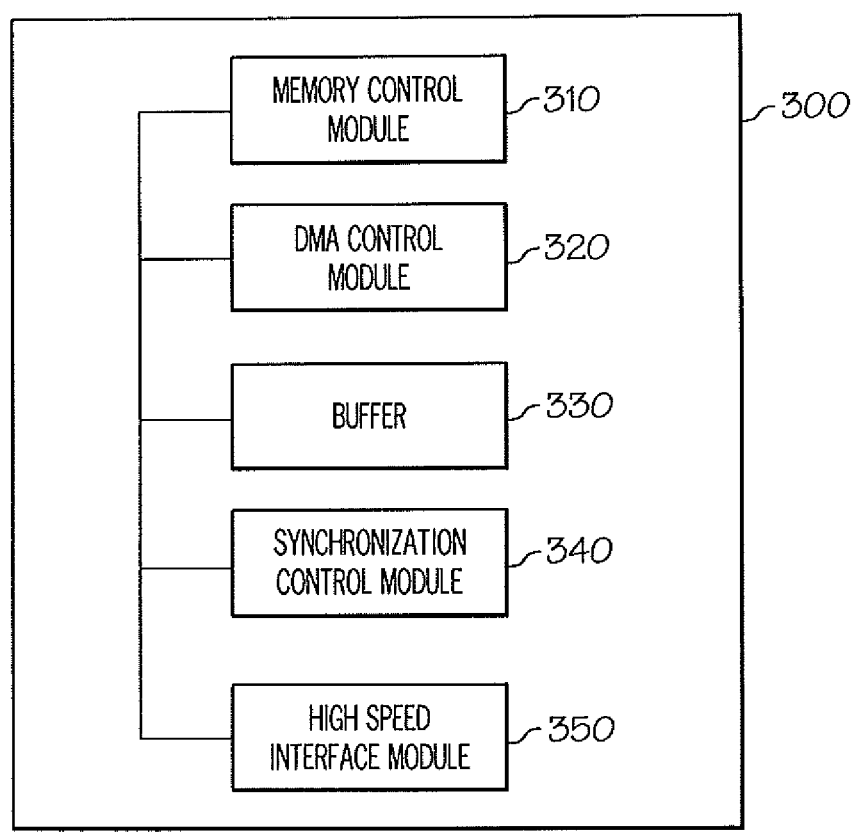
FIG. 3 is a diagram schematically illustrating a configuration of a controller unit in FIG. 1.

FIG. 3 is a diagram schematically illustrating a configuration of the controller unit provided in the PCI-Express type storage device according to the embodiment. Referring to FIG. 3, the controller unit 300 according to the embodiment includes: a memory control module 310 which controls data input/output of the memory disk unit 100; a DMA (Direct Memory Access) control module 320 which controls the memory control module 310 to store the data in the memory disk unit 100, or reads data from the memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the memory disk unit 100 to transmit the synchronized data signal to the memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure and processes the data transmitted/received between the synchronization control module 340 and the DMA control module 320 without loss at high speed by buffering the data transmitted/received between the synchronization control module 340 and the DMA control module 320 using the buffers and adjusting data clocks.

The auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the memory disk unit 100, the backup storage unit 600, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the memory disk unit 100 through the controller unit 300.

The backup storage unit 600 is configured as a low-speed non-volatile storage device such as a hard disk and stores data of the memory disk unit 100.

The backup control unit 700 backs up data stored in the memory disk unit 100 in the backup storage unit 600 by controlling the data input/output of the backup storage unit 600 and backs up the data stored in the memory disk unit 100 in the backup storage unit 600 according to an instruction from the host, or when an error occurs in the power source of the host due to a deviation of the power transmitted from the host deviates from the threshold value.

Figure 4:
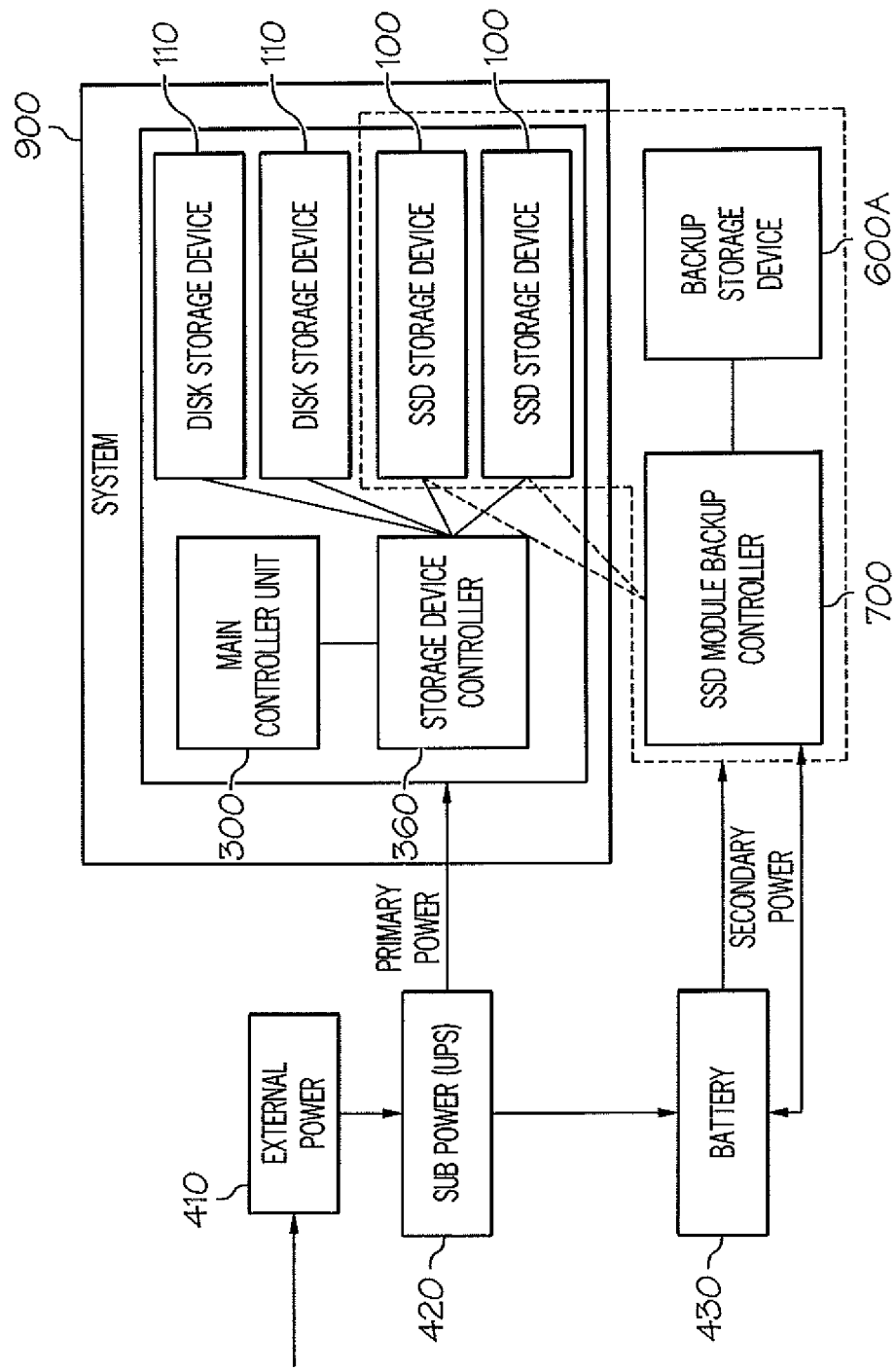
FIG. 4 is a diagram schematically illustrating a configuration of a backup and restoration system for an SSD according to an embodiment of the present invention.
Figure 5:
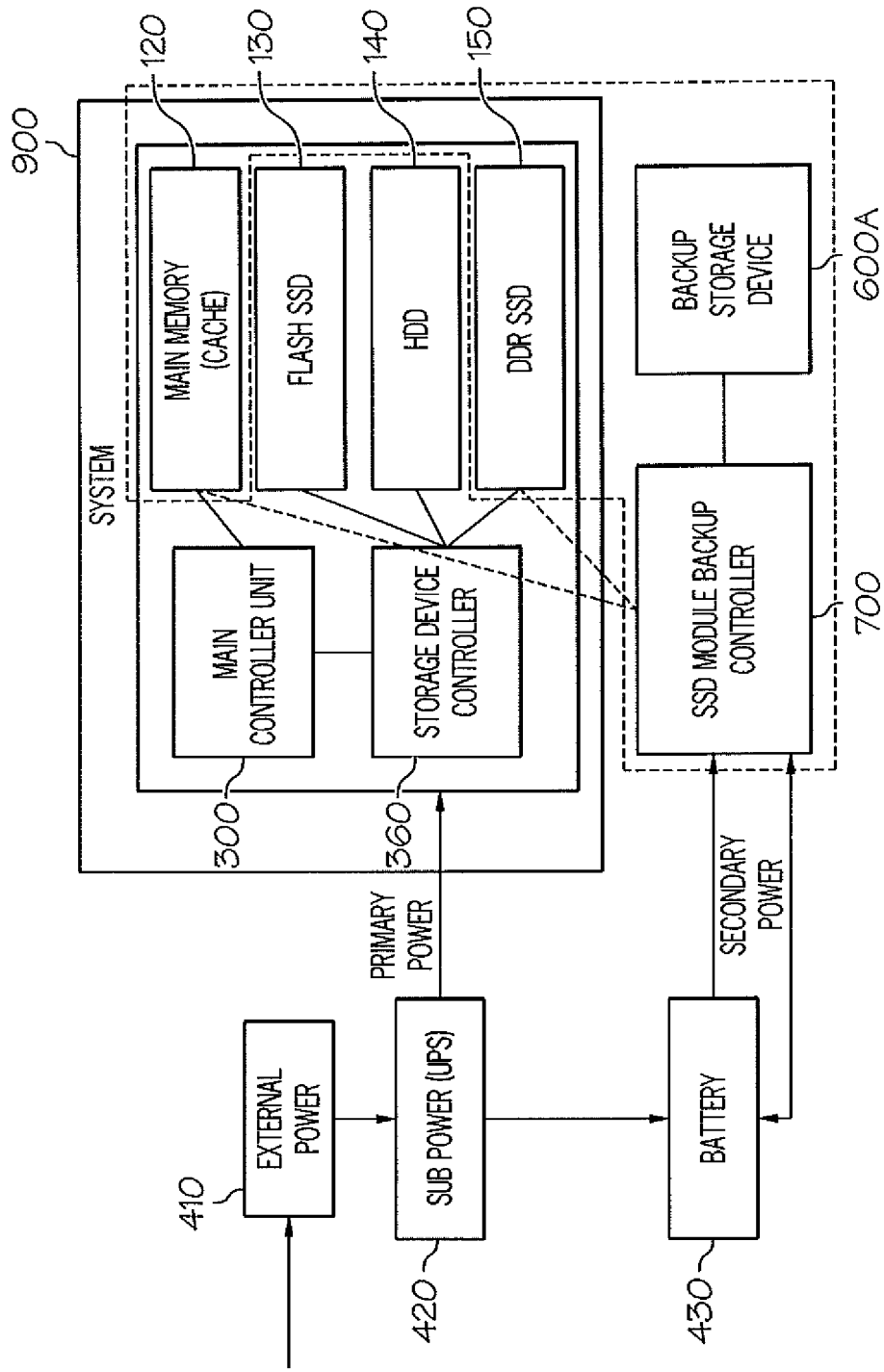
FIG. 5 is a diagram schematically illustrating the backup and restoration system of FIG. 4 as implemented within a single SSD system according to an embodiment of the present invention.
Figure 6:
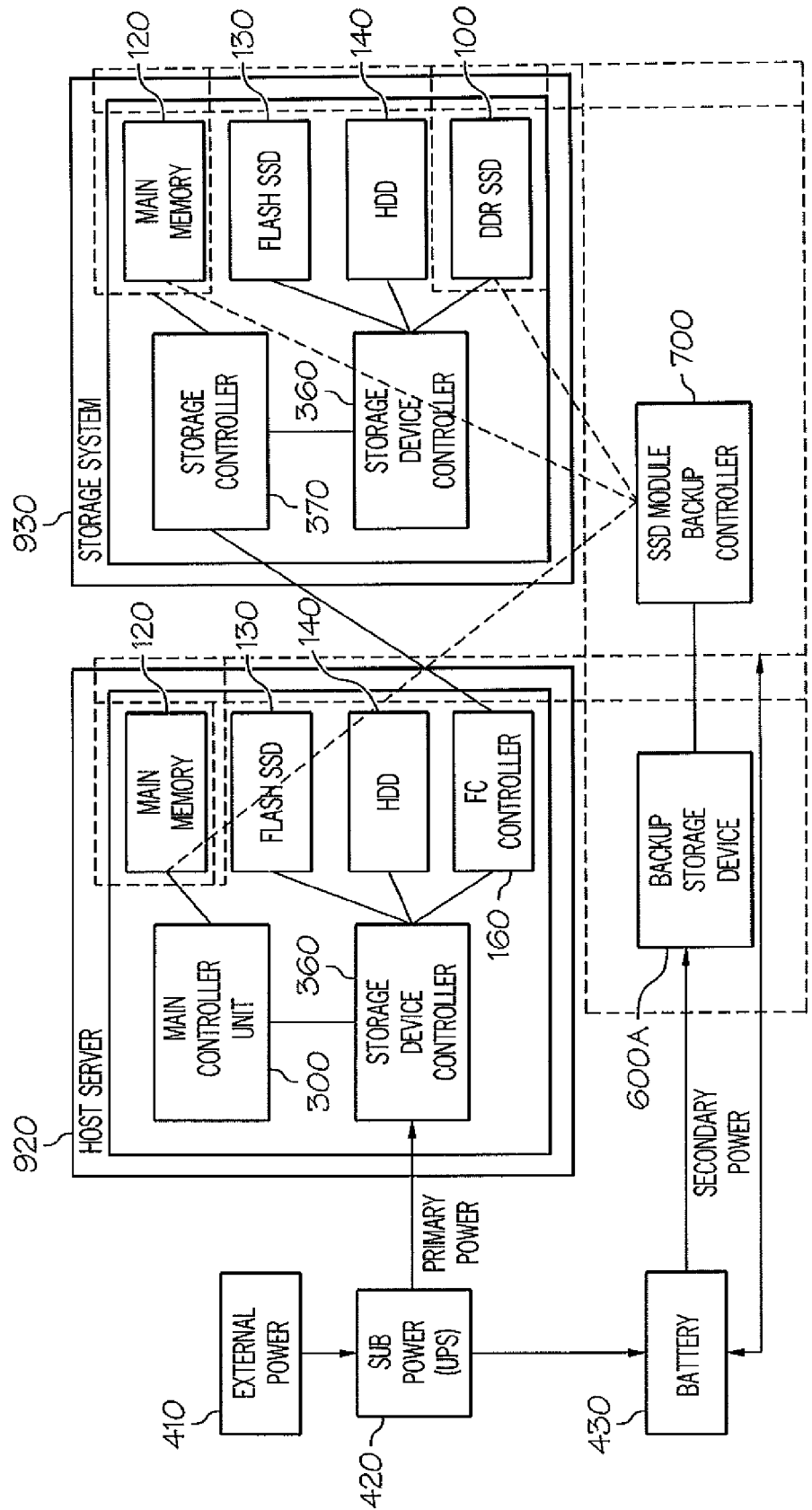
FIG. 6 is a diagram schematically illustrating the backup and restoration system of FIG. 4 as implemented within a networked SSD system according to an embodiment of the present invention.

Referring now to FIGS. 4-6, a more detailed diagram of a backup and restoration system for a SSD is shown. As first depicted in FIG. 4, system 900 is shown having a main controller unit 300 coupled to a storage device controller 360, which itself is coupled to disk storage units 110, and a set (one or more) of SSD memory disk units (hereinafter SSDs 100). FIG. 4 further shows a primary power supply 410 coupled to an uninterruptable power supply (UPS 420) for providing primary power to system 900. Still yet, under the present invention a secondary power supply 430 is coupled to an SSD backup controller 700, a backup storage device 600A, and an at least one SSD memory disk unit 100.

In general, secondary power supply 430 is activated in response to a deactivation of primary power supply 410. When this happens, backup controller 700 backs up SSD data stored on the SSDs 100 (e.g., the DDR SSD 150) as well as main memory data from main memory 120 to back up storage device 600A. Under this embodiment, secondary power supply 430 is deactivated when the backup of the SSD data is complete. Then, when primary power supply 410 is reactivated, backup controller 700 restores the SSD data to the SSDs 100 and main memory data to main memory 120 from backup storage device 600A.

This embodiment is shown in greater detail in conjunction with the single SSD system 910 of FIG. 5. Similar to system 900 of FIG. 4, system 910 comprises a main controller unit 300 coupled to a storage device controller 360, which itself is coupled to main memory (cache) 120, a flash SSD 130, a high density drive (HDD) 140, and a double data rate (DDR) SSD 150. FIG. 5 further shows a primary power supply 410 coupled to an uninterruptable power supply (UPS 420) for providing primary power to system 900. Still yet, under the present invention a secondary power supply 430 is coupled to an SSD backup controller 700 and a backup storage device 600A, as well as main memory 120 and DDR SSD 150.

In general, secondary power supply 430 is activated in response to a deactivation of primary power supply 410. When this happens, backup controller 700 backs up SSD data stored on the SSDs 100 as well as main memory data from main memory 120 to backup storage device 600A. Under this embodiment, secondary power supply 430 is deactivated when the backup of the SSD data is complete. Then, when primary power supply 410 is reactivated, backup controller 700 restores the SSD data to the SSDs 100 and main memory data to main memory 120 from backup storage device 600A.

FIG. 6 shows these concepts in a more complex networked scenario. As depicted, a host server 920 is coupled to a storage system 930. As depicted, storage system 930 comprises a storage controller 370 coupled to a storage device controller 360, which itself is coupled to main memory (cache) 120, a flash SSD 130, a high density drive (HDD) 140, and a double data rate (DDR) SSD 150. Host server 920 comprises a main controller unit 300 coupled to a storage device controller 360, which itself is coupled to main memory (cache) 120, a flash SSD 130, a high density drive (HDD) 140, and a fibre channel (FC) controller 160.

FIG. 6 further shows a primary power supply 410 coupled to an uninterruptable power supply (UPS 420) for providing primary power to host server 920 and storage system 930. Still yet, under the present invention a secondary power supply 430 is coupled to an SSD backup controller 700, a backup storage device 600A, main memory 120 and DDR SSD 150 of storage system 930, and main memory 120 of host server 920.

In general, secondary power supply 430 is activated in response to a deactivation of primary power supply 410. When this happens, backup controller 700 backs up SSD data stored on the SSDs 100, storage system data from main memory 120 of storage system 930, and server data from main memory 120 of host server 920 to backup storage device 600A. Under this embodiment, secondary power supply 430 is deactivated when the backup of the SSD data is complete. Then, when primary power supply 410 is reactivated, backup controller 700 restores the SSD data, the storage system data, and the server data to the SSDs 100, main memory 120 of storage system 920, and main memory 120 of host server 920, respectively These operations are further described in the flow shown below:
1. Normal Operation
   a. AC Power supplied the power to the Sub power (UPS) device
   b. The Sub power (UPS) recharges Volatile Device Backup batteries.
   c. System uses the Sub power (UPS) to run the system.
   d. This battery is not used for the normal operation. It uses the primary power to recharge the battery.
   e. The secondary power is not used in order to save the power.
2. Emergency Operation
   a. Backup
      i. AC Power off→Sub power (UPS) Power supply off-→the secondary Power supply (Battery) kick-in.
      ii. Secondary Power will supply the DC power to the SSD, SSD Module Backup Controller, and the Backup Storage Device.
      iii. The SSD Module Backup Controller automatically backup the data from the SSD Device to the Backup Storage Device. When the backup is completed, it signals to the battery that the operation is completed.
      iv. The battery system stops the secondary power supply.
   b. Restore
      i. When AC power is restored, the primary power supply is reconnected by the Sub power (UPS). When the primary power supply is active, then the battery system senses it and notify the Volatile Module Backup Controller
      ii. SSD Module Backup Controller restores the data from the Backup Storage Device to the SSD Storage Device.
      iii. When restored, it sends a signal to the Battery system and the battery stops the secondary power.

While the exemplary embodiments have been shown and described, it will be understood by those skilled in the art that various changes in form and detail may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A system for backing up and restoring SSD data stored on a PCI-Express semiconductor storage device (SSD), comprising:
   a secondary power supply coupled to a backup storage device, at least one SSD memory disk unit, and directly connected to an SSD backup controller;
   wherein the secondary power supply is activated when a deactivation of a primary power supply is detected; and
   wherein the backup controller automatically makes a complete back up of SSD data stored on the at least one SSD memory disk unit to the backup storage device when the failure of the primary power supply is detected.

2. The system of claim 1, wherein the secondary power supply is deactivated when the backup of the SSD data is complete.

3. The system of claim 1, wherein the backup controller restores the SSD data to the SSD memory disk unit from the backup storage device in response to a reactivation of the primary power supply.

4. The system of claim 1, further comprising a main memory, wherein the backup controller further backs up main memory data from the main memory to the backup storage device in response to the deactivation of the primary power supply.

5. The system of claim 4, wherein the backup controller further restores the main memory data to the main memory in response to a reactivation of the primary power supply.

6. The system of claim 1, the at least one SSD memory disk unit comprising:
   a host interface unit;
   a DMA controller coupled to the host interface unit;
   an ECC controller coupled to the DMA controller;
   a memory controller coupled to the ECC controller; and
   a memory array coupled to the memory controller, the memory array comprising at least one memory block.

7. The system of claim 1, the at least one SSD memory disk unit providing storage for an attached computer device.

8. A system for backing up and restoring SSD data stored on a network-based PCI-Express semiconductor storage device (SSD), comprising:
   a storage system comprising a storage system main memory and an at least one SSD memory disk unit;
   a host server coupled to the storage system, the host server comprising a server main memory unit; and
   a secondary power supply directly connected to a backup controller and coupled to a backup storage device, wherein the backup controller is activated when a deactivation of a primary power supply is detected, and wherein the backup controller automatically makes a complete back up of: server data from the host server main memory, storage system data from the storage system main memory, and SSD data from the at least one SSD memory disk unit to the backup storage system when the activation of the secondary power supply is detected.

9. The system of claim 8, wherein the secondary power supply is deactivated when the backup of the server data, the storage system data, and the SSD data is complete.

10. The system of claim 8, wherein the backup controller restores the server data, the storage system data, and the SSD data from the backup storage device in response to a reactivation of the primary power supply.

11. The system of claim 8, the at least one SSD memory disk unit comprising:
   a host interface unit;
   a DMA controller coupled to the host interface unit;
   an ECC controller coupled to the DMA controller;
   a memory controller coupled to the ECC controller; and
   a memory array coupled to the memory controller, the memory array comprising at least one memory block.

12. The system of claim 8, the at least SSD memory disk unit providing storage for an attached computer device.

13. The system of claim 8, the primary power supply comprising an unintenuptable power supply.

14. A method for backing up and restoring SSD data stored on a PCI-Express semiconductor storage device (SSD), comprising:

providing a secondary power supply coupled to a backup storage device, an at least one SSD memory disk unit, and directly connected to an SSD backup controller;

activating the secondary power supply when a deactivation of a primary power supply is detected; and automatically making a complete back up of SSD data stored on the at least one SSD memory disk unit to the backup storage device using the backup controller when the failure of the primary power supply is detected.

15. The method of claim 14, further comprising deactivating the secondary power supply when the backup of the SSD data is complete.

16. The method of claim 14, further comprising restoring the SSD data to the SSD memory disk unit from the backup storage device using the backup controller in response to a reactivation of the primary power supply.

17. The method of claim 14, further comprising backing up main memory data from a main memory to the backup storage device using the backup controller in response to the deactivation of the primary power supply.

18. The method of claim 17, further comprising:

restoring the main memory data to the main memory using the backup controller in response to a reactivation of the primary power supply.

19. The method of claim 14, the at least one SSD memory disk unit comprising:

a host interface unit;

a DMA controller coupled to the host interface unit;

an ECC controller coupled to the DMA controller;

a memory controller coupled to the ECC controller; and a memory array coupled to the memory controller, the memory array comprising at least one memory block.

20. The method of claim 14, the at least SSD memory disk unit providing storage for an attached computer device.

* * * * *